United States Patent
Tang

(10) Patent No.: US 7,272,141 B1
(45) Date of Patent: Sep. 18, 2007

(54) SYSTEM AND METHOD FOR SERIALIZING BULK VIRTUAL CIRCUIT CONNECTION REQUESTS

(75) Inventor: Harry Tang, Atlanta, GA (US)

(73) Assignee: AT&T BLS Intellectual Property, Inc., Wilmington, DE (US)

(*) Notice: Subject to any disclaimer, the term of this patent is extended or adjusted under 35 U.S.C. 154(b) by 1201 days.

(21) Appl. No.: 10/084,224

(22) Filed: Feb. 28, 2002

(51) Int. Cl.
H04L 12/28 (2006.01)
H04J 3/16 (2006.01)

(52) U.S. Cl. .................................. 370/395.2; 370/468
(58) Field of Classification Search ..................... None
See application file for complete search history.

(56) References Cited

U.S. PATENT DOCUMENTS 6,034,962 A * 3/2000 Ohno et al. ................. 370/399
6,822,961 B1 * 11/2004 Constantinof et al. ... 370/395.2
6,999,414 B2 * 2/2006 Gummalla et al. ......... 370/230

* cited by examiner

Primary Examiner—Doris H. To
Assistant Examiner—Warner Wong
(74) Attorney, Agent, or Firm—Cantor Colburn LLP

(57) ABSTRACT

A connection management system (CMS) serializes bulk virtual circuit connection requests made to a connection creation system (CCS) that is responsible for establishing virtual connections between one or more end users and an ISP. The CMS uses a set of serialization parameters to evaluate a set of conditions. The results of the evaluations are used to serialize sending bulk virtual circuit connection requests to the CCS for provisioning. In effect, the sending of a bulk virtual circuit connection request is delayed until a prior bulk virtual circuit connection request completes, whether successfully or unsuccessfully. In addition, a bulk virtual circuit connection request can be re-submitted in the event of a failed prior request or a prior request that remains pending for an unexpectedly long duration.

3 Claims, 3 Drawing Sheets

| | CONDITION | ACTION |
|---|---|---|
| (1) | (LAST_VCI - CURRENT_VCI) > DELTA_THRESHOLD | PROVISION VIRTUAL CIRCUIT FOR END USER |
| (2) | STATUS = SUCCESS AND (LAST_VCI - CURRENT_VCI) < DELTA_THRESHOLD | SEND BULK REQUEST |
| (3) | STATUS = FAIL | SEND BULK REQUEST |
| (4) | STATUS = SUCCESS AND (LAST_VCI - CURRENT_VCI) > DELTA_THRESHOLD | DO NOT SEND BULK REQUEST |
| (5) | STATUS = IN_PROCESS AND CURRENT_TIME - START_TIME) < TIME_THRESHHOLD | DO NOT SEND BULK REQUEST |
| (6) | STATUS = IN_PROCESS AND (CURRENT_TIME - START_TIME) > TIME_THRESHHOLD | SEND BULK REQUEST |

SYSTEM AND METHOD FOR SERIALIZING BULK VIRTUAL CIRCUIT CONNECTION REQUESTS

BACKGROUND

1. Field of the Invention

The present invention relates generally to communication networks. More particularly, the present invention relates to provisioning virtual circuits in virtual paths created to provide data communication paths across communication networks.

2. Background of the Invention

End users desiring ADSL service obtain connectivity to communication networks through ADSL-ready personal computers or other ADSL-ready network equipment. The end user's ADSL-ready device is coupled to an ADSL port of a digital subscriber line access multiplexer (DSLAM). The DSLAM can be located in a telephone company's central office. The DSLAM is a switch that aggregates multiple ADSL user connections on the same physical link. The DSLAM is physically coupled to a switch on a communication subnetwork, such as an asynchronous transfer mode (ATM) subnetwork. The communication subnetwork generally comprises a plurality of switches. One or more of these switches can be physically connected to a broadband gateway. The switch physically linked to the broadband gateway may be the same switch that couples the DSLAM to the ATM network. However, in general, different switches may be used. The broadband gateway provides efficient transmission of data to an internet service provider (ISP). The broadband gateway can also transmit data for multiple users. For example, the broadband gateway can aggregate data received from multiple DSLAMS.

The broadband gateway transmits data over a logical connection to an ISP. The logical connection can be physically implemented through one or more ATM switches. The broadband gateway is not required. That is, data destined for the ISP reach the ISP by direct transmission between the switches on the ATM network. However, because the bandwidth management services of the broadband gateway are not available, transmitting data using on network switches usually makes less efficient use of available network bandwidth.

The functionality provided by the broadband gateway can be further divided into ingress and egress function. The ingress function refers to the data that enters the broadband gateway from the end user side. The egress function refers to the data that leaves the broadband gateway destined for the ISP. Using the concept of ingress and egress functionality, the broadband gateway can be implemented as multiple broadband gateway switches. One or more of the broadband gateways handle the ingress portion of the data flow, and the one or more of the broadband gateways handle the egress portion of the data flow. For, example, it has been found advantageous to use a single egress broadband gateway to transmit data from multiple ingress broadband gateways to an ISP. The advantage of using a single egress broadband gateway is that it further aggregates the data provided to the ISP.

A network management system (NMS) is responsible for end-to-end connections from the end user to the broadband gateway. This connection is a virtual path connection. The virtual path connection is identified by a virtual path identifier (VPI). A virtual connection is also established as described above from the broadband gateway to the ISP. It is assumed that the virtual connection from the broadband gateway to the ISP is pre-established. By pre-establishing this connection, when the user sends data over the connection to the broadband gateway, it is automatically routed to the ISP.

To enable this automatic communication of data from end users to the ISP, a virtual path connection is established by broadband gateway. One or more virtual circuit connections can be provisioned in the virtual path to provide data connectivity for end users over the communication network. A virtual circuit connection must be set up for each end user to the broadband gateway. In addition, the broadband gateway must switch the input port associated with the virtual path to an output port associated with the virtual path to the ISP. Each virtual circuit connection in a virtual path connection is identified by a virtual circuit identifier (VCI).

Multiple virtual circuit connections can be set up in a single virtual path. Thus, a virtual path establishes a pipe for a plurality of virtual circuit connections. For example, assume a virtual path identified by VPI 1 is provisioned for two end users. A virtual circuit connection having a VCI value of 32 can be provisioned for the first end user, and a virtual circuit connection having a VCI value of 33 can be provisioned for the second end user.

The end users in this case can be identified by a VPI/VCI pair. For example, the first end user is identified by VPI/VCI pair 1/32, and the second end user is identified by the VPI/VCI pair 1/33. Thus, a VPI/VCI pair identifies a virtual path connection and a virtual circuit within that virtual path connection. The VPI/VCI pair must be unique for each end user.

Broadband gateways also typically provide the ability to establish bulk virtual circuit connections. A request to establish such a bulk virtual circuit connection is termed a bulk virtual circuit connection request. When a bulk virtual circuit connection request is made, a range of virtual circuits is established. A primary advantage of using the bulk virtual circuit connection request is that the virtual circuits in a virtual path are set up at one time, thereby precluding the need to set up each virtual circuit connection individually. For example, after a bulk virtual circuit connection request is successfully established, a new virtual circuit can be provisioned for an end user using any of the virtual circuit connections established in response to the request.

VPIs and VCIs are set up on a port-by-port basis. There may be, but need not be, any correlation between the VPIs and VCIs assigned to the various ports that make up the virtual connection from the resident to the broadband gateway. However, the VCI for a particular virtual connection must be the same for all of the ports in that virtual path. Moreover, the VPI/VCI pairs assigned to the different virtual circuits must be unique for each end user.

A network management system (NMS) executes software responsible for managing network resources to provide ADSL services to end users. One aspect of this management function is setting up and managing the virtual paths and virtual circuits required to provision services.

To establish a bulk VC connection, the NMS sends a bulk virtual circuit connection request to, for example, a Nortel Networks Service Creation System (SCS). Typically, the request is sent through a common object request broker architecture (CORBA) gateway. The SCS server is responsible for managing the broadband gateways. The bulk virtual circuit connection is typically established in response to a request for a VCI in a range for which there is no current VCI. When the bulk virtual circuit connection request is made, a range of virtual circuit connections having VCIs including the requested VCI is set up. Bulk virtual circuit connection requests can also be made when the available VCIs begin to expire. In this case, the bulk virtual connection request continues the range of VCIs available in the virtual path. When the request is satisfied, the SCS sends a message back to the NMS indicating that the request is set up.

Requests to set up VCIs are processed substantially simultaneously by the NMS. This can lead to problems where there are multiple requests. For example, suppose there is a first request for provisioning an end user with a virtual circuit connection having a VCI of 128. If the requested VCI is beyond the range of currently provisioned VCIs, the NMS sends a bulk virtual circuit connection request to the SCS server to establish a virtual path having VCIs with a range that covers the requested VCI. Further, assume that a second request for provisioning an end user with a virtual circuit connection is made. In this case, that the second request requires that the NMS send a second bulk virtual circuit connection. Assume that the second request has at least one VCI in common with the first and pending bulk virtual circuit connection request.

In such a case, the first bulk virtual circuit connection request completes successfully, and establish a virtual path having VCIs with the desired range. However, when the second request reaches the SCS server, the request will be denied. That is, the SCS server will indicate that the desired VC bulk connection cannot be made because the VCI range is already being used. An error message indicating the range is already in use is returned in response to the second request.

This error arises whether only one or a plurality of VCIs are the same in the pending and new bulk virtual circuit connection requests. Moreover, the error message returned is the same in either case. Because the error message is the same, determining the cause of the problem can be difficult or impossible.

In response to such errors, the NMS is designed to reset itself to a stable state. The stable state is a prior state that the NMS knows is a valid state. The NMS returns to this state despite successful completion of the first request. This is because the failure of the second request casts doubt as to the validity of the first request.

Another problem arises because users can provision virtual paths without using NMS. For example, an operator can use a console coupled to the SCS to request and establish one or more virtual paths. Using the console, the user can perform bulk virtual circuit connection requests or establish VCIs one at a time. These requests can conflict with NMS-generated provisioning requests.

Another problem with NMS is that if there are two requests that call the same method at approximately the same time the methods can merge. This means that the two methods become a single method. As a result, one of the requests is lost.

SUMMARY OF THE INVENTION

The present invention solves the foregoing problems by serializing requests for allocation of bulk virtual circuit connections. Bulk virtual circuit connection requests are delayed so that only one request for a bulk virtual circuit connection is sent at a time. Another request is not sent until allocations in response to the first request are completed. In this manner, the problem with multiple requests for the same range of VCIs is avoided. Serializing bulk virtual circuit connection requests avoids the problem of having to roll back to a prior known state. This is because serializing bulk virtual circuit connection requests eliminates the problems associated with close-in-time requests as the response to one request must complete prior to the next request being processed. In addition, serialization prevents the merging of methods because the requests arrive at the SCS at different times.

Serialization is preferably performed when an order to provision one or more virtual circuits in a virtual path is received. When the order is received, it is first determined whether a bulk virtual circuit connection request is required. According to one embodiment of the present invention, the determination is made by determining the number of available established virtual circuit connections in the virtual path when the order to establish a new virtual circuit connection is received. If the number of available established virtual circuit connections is greater than a pre-determined threshold, then the virtual circuit is provisioned, and no bulk virtual circuit connection request is made.

If the number of available established virtual circuit connections is less than a pre-determined threshold, then the state of the system in terms of bulk virtual circuit connection requests is considered prior to sending a bulk virtual circuit connection request. The determination of whether to send a bulk virtual circuit request is preferably made after evaluating several considerations, including the status of bulk virtual circuit connection requests, the processing time of pending bulk virtual circuit connection requests, the number of available established virtual circuit connections in the virtual path and other considerations.

For example, in an embodiment of the present invention, a bulk virtual circuit request is sent if there are no pending bulk virtual circuit connection requests and there are too few available established virtual circuit connections in the virtual path or a prior bulk virtual circuit request has failed. In addition, a bulk virtual circuit request is sent if a pending bulk virtual circuit connection request has taken too long to process. Bulk virtual circuit connection requests are not sent if there is a pending request that has not taken too long to complete or if there are no pending bulk virtual circuit connection requests and there are a sufficient number of available established virtual circuit connections in the virtual path.

In one embodiment, the present invention is a method for provisioning an end user with a virtual circuit in a virtual path. The method is preferably performed on a connection management server (CMS). According to the method, the CMS performs the step of receiving a work order requesting provisioning of the virtual circuit for the end user. After, receiving the work order, the CMS performs the steps of determining a virtual circuit identifier of an available virtual circuit in the virtual path and determining whether there is less then a pre-determined number of available virtual circuits remaining in the virtual path. If there are more than the pre-determined number of available virtual circuits remaining in the virtual path, the CMS performs the step of provisioning the virtual circuit for the end user. If there are less than the pre-determined number of available virtual circuits remaining in the virtual path, the CMS performs the step of determining whether to establish additional virtual circuits in the virtual path. If the CMS determines that additional virtual circuits need to be established in the virtual path, it performs the step of serializing virtual circuit requests to establish additional virtual circuits in the virtual path.

In another embodiment, the present invention is a system for provisioning an end user with a virtual circuit in a virtual path. The system includes a connection management server that determines a virtual circuit identifier of an available virtual circuit connection in the virtual path and determines whether there are less then a pre-determined number of available virtual circuit connections remaining in the virtual path. The connection management server can initiate a request for additional virtual circuit connections. The system further includes a conditions table comprising a plurality of serialization conditions that the connection management server consults prior to initiating a request for additional virtual circuit connections. The conditions in the condition table are chosen to be sufficient to serialize a plurality of requests made by the connection management server to establish additional virtual circuit connections. The system also includes a connection creation system that provisions additional virtual circuit connections in accordance with requests received from the connection management server.

BRIEF DESCRIPTION OF THE DRAWINGS

FIG. 2 is a condition table for use in serializing bulk virtual circuit connection requests according to an embodiment of the present invention.

DETAILED DESCRIPTION OF THE INVENTION

Figure 1:
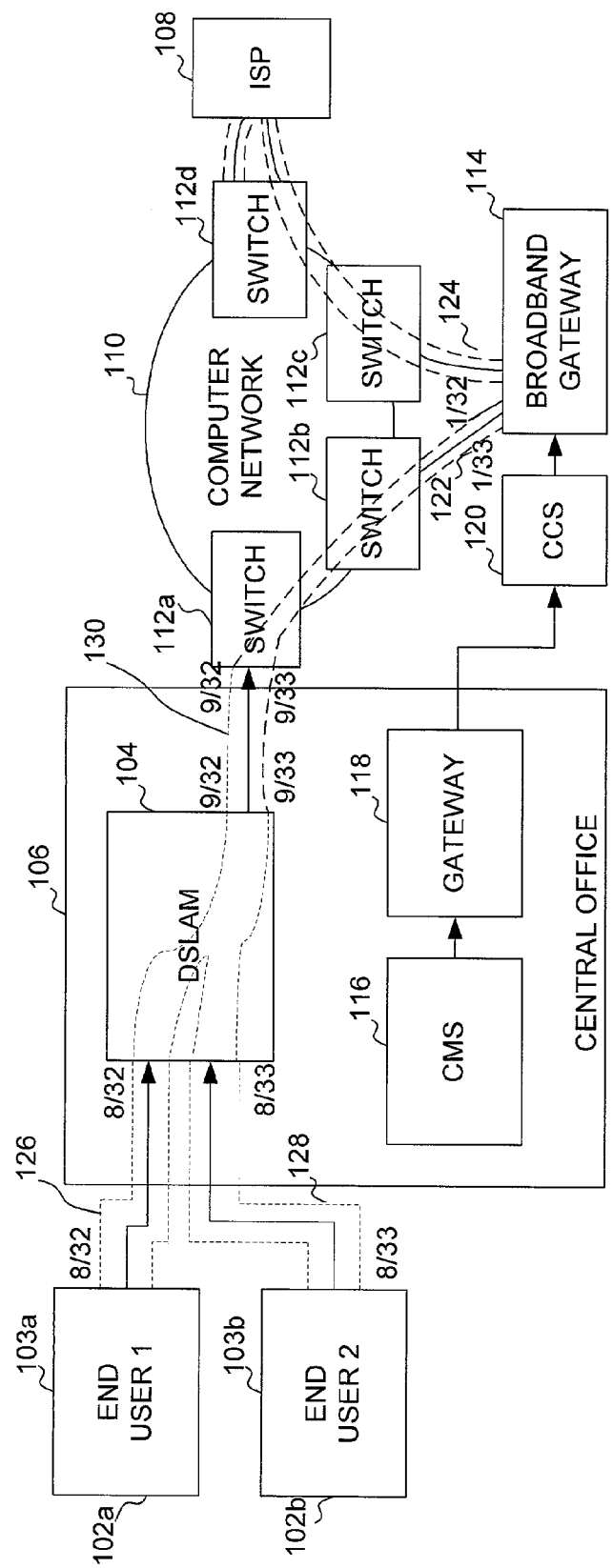
FIG. 1 is a schematic diagram of a system for serializing bulk virtual circuit connection requests according to an embodiment of the present invention.

FIG. 1 is a schematic for a system for system for serializing bulk virtual circuit connection requests according to an embodiment of the present invention. As used herein, the terms "virtual circuit" and "virtual circuit connection" are used interchangeably. As used herein, the terms "virtual path" and "virtual path connection" are used interchangeably. End users 102a and 102b communicate with a digital subscriber loop access multiplexer (DSLAM) 104. DSLAM aggregates data destined for an Internet service provider (ISP) 108 for more efficient transmission over a computer subnetwork 110. Preferably, computer subnetwork 110 is an asynchronous transfer mode (ATM) subnetwork. Computer subnetwork 110 comprises network switches 112a, 112b, 112c and 112d. Exemplary network switches are the CBX500 switches available from Lucent of New Jersey. Network switch 112a is physically coupled to DSLAM 104. Network switches 112b and 112c are physically coupled to a broadband gateway 114. An exemplary broadband gateway is the Broadband Service Node (BSN) offered by Networks.

End users 102a and 102b transmit data to and receive data from ISP 108 over a data path comprising DSLAM 104, computer network 110 and broadband gateway 114. Data ingress refers to data transmitted from DSLAM 104 through network switches 112a and 112b to broadband gateway 114. Data egress refers to data transmitted from broadband gateway 114 through network switches 112c and 112d to ISP 108. As is apparent to those skilled in the art, broadband gateway 114 can be physically implemented as one or more broadband gateways. If implemented as a plurality of broadband gateways, one or more of the broadband gateways can be devoted to data ingress, and one or more of the broadband gateways can be devoted to data egress. Alternatively, each of the broadband gateways can perform both data ingress and data egress.

A connection management server (CMS) 116 provides requests for setting up virtual paths and virtual circuit connections to a connection creation system (CCS) 120. CMS 116 can be a network management system (NMS) available from Bell team, for example release NMS version 5.0. CCS 120 can be a Service Creation System (SCS) available from Nortel Networks, for example, release SCS version 2.3.0. CCS 120 is coupled to broadband gateway 114. CMS 116 is configured according to the present invention to serialize bulk virtual circuit path connection requests to avoid failed requests that lead to reversion to a prior stable state, and to avoid method merging that otherwise result when requests for overlapping virtual circuit connections are made close in time. In this instance, a second request is close in time to a first request if the second request is presented to CCS 120 prior to the completion of the first request.

Completion of a virtual path from an end user 102a or 102b to ISP 108 requires establishing a virtual path from the end user or end users to broadband gateway 114, and establishing a virtual path from broadband gateway to ISP 108. Virtual path 122 provides communication from broadband gateway 114 to end users 102a and 102b. Virtual path 124 provides communication from broadband gateway 114 to ISP 108. Virtual path 124 is preferably pre-established. In addition, broadband gateway 114 is configured to couple a port on the broadband gateway that is connected to virtual path 122 with a port on broadband gateway 144 that is connected to virtual path 124. Thus, when a virtual path is established from an end user to broadband gateway 114, data sent by the user along the virtual path automatically reaches ISP 108. Likewise, data sent by ISP 108 can automatically reach an end user.

Within a virtual path, a virtual circuit connection is established to provide end-to-end communication between an end user 102a or 102b and ISP 108. Such virtual circuit connections are generally called permanent virtual circuits (PVCs). PVCs provide an "always on" communication link between an end user and an ISP. In FIG. 1, for example, a virtual circuit identified by VCI 32, is established in a virtual path comprising virtual paths 126 (VPI 8), 130 (VPI 9), 122 (VPI 1) and 124 (assumed already established) to provide a communication link between end user 102a and ISP 108. Similarly, a virtual circuit identified by VCI 33, is established in a virtual path comprising virtual paths 128 (VPI 8), 130 (VPI 9), 122 (VPI 1) and 124 (assumed already established) to provide a communication link between end user 102b and ISP 108.

According to one embodiment of the present invention, CMS 116 is configured to provide serialization of bulk virtual circuit connection requests. In an embodiment of the present invention, this configuration can be in the form of software to monitor the relevant state of the system. The software preferably incorporates the following serialization parameters.

Last_VCI is a parameter that keeps track of the last VCI value that was used in any set up of a virtual path. That is, last_VCI takes the maximum VCI value of the last bulk virtual circuit connection range previously successfully provisioned. For example, if the last successful bulk virtual circuit connection request established VCIs in the range 32-83, last_VCI is set to 83. If a subsequent bulk virtual circuit connection request successfully establishes VCIs in the range 84-135, last_VCI is set to 135. Preferably, last_VCI is initialized to 32 to meet system requirements in many broadband gateways.

Current_VCI is the value of the VCI associated with a provisioning order to provide service to an end user at the time the parameter is used. For example, assume a virtual path reserving VCIs 32-83 is successfully provisioned. Subsequently, two users request service, each requiring a single virtual circuit, and consequently, one VCI. Preferably, VCI value 32 is assigned to one user and VCI value 33 is assigned to the other user. In this case, current_VCI is set to the value 33. If VCIs for virtual circuits corresponding to five more end users are subsequently provisioned, current_VCI will have the value 38.

Delta_threshold is a value that provides a trigger threshold for generating a request for the next VC bulk connection. Delta_threshold measures how close the current VCI is to the maximum VCI value in the currently provisioned virtual paths. That is delta_threshold is an estimate of the number of available established virtual circuit connections that remain in the virtual path. Preferably, the value to compare to delta_threshold is the difference between last_VCI and current_VCI. Specifically, delta_threshold is preferably compared to the quantity last_VCI−current_VCI. If this value is less than delta_threshold, a request for another bulk virtual circuit connection is sent to CCS 120. Preferably, the default value of the delta_threshold parameter is ten.

Status is a parameter that captures the status of the bulk connection. There are preferably three values the status parameter can take, SUCCESS, FAIL and IN_PROCESS. Preferably, status is initialized with the value SUCCESS.

Start_time is a parameter that is the time that the last bulk virtual circuit connection request was sent. It can be set by referring to a system clock of a computer included in CMS 116. Preferably, start_time is stored in units of seconds. If the prior request is taking too long, the prior bulk virtual circuit connection request can be sent again.

Current_time is a parameter that is the time that the last bulk virtual circuit connection request was sent. It can be set by referring to a system clock of a computer included in CMS 116. Preferably, current_time is stored in units of seconds. If the prior request is taking too long, the prior VC bulk connection request can be sent again.

Time_threshold is a parameter that indicates a maximum time that should be allowed for a response to a bulk virtual circuit connection request. Preferably, the time_threshold parameter is stored in unit of seconds. If the time_threshold parameter is exceeded, then a prior bulk virtual circuit connection request has taken too long. In this case, the prior bulk virtual circuit connection request is preferably sent again. Time_threshold can be used in conjunction with a the start_time and current_time parameters to determine whether a prior request is taking too long. Preferably, the default value of the time_threshold parameter is six hundred seconds (i.e., ten minutes).

These parameters are used according to an embodiment of the present invention to serialize the VC bulk connection request process. FIG. 2 is an exemplary condition table that CMS 116 uses to determine whether to submit a bulk virtual circuit connection request in response to a request to provision one or more new virtual circuits for customers. The condition table 201 shown in FIG. 2 comprises six conditions or states that CMS 116 can encounter when it receives a request to provision one or more end users with virtual circuits in a virtual path.

Condition (1) determines when the difference between the last_VCI parameter and the current_VCI parameter is greater than delta_threshold. If condition (1) is satisfied, CMS 116 sends a request to CCS 120 to provision the end user. This is because in this case additional VCIs are not required, so no bulk virtual circuit connection request need be made to obtain more VCIs.

If condition (1) is not satisfied, CMS 116 must make a bulk virtual circuit connection request to CCS 120 to obtain an additional VCI range. In this case, the remaining 5 conditions (described below) are considered to determine if the bulk virtual circuit connection request can indeed be made. Consequently, condition (1) is a threshold condition in that the remaining five conditions are considered only if condition (1) is not satisfied.

Condition (2) determines when the status parameter has the value SUCCESS and the difference between the last_VCI and current_VCI parameters is less than delta_threshold. The status having a value other than IN_PROCESS indicates that the prior VCI connection request has completed, whether successfully or unsuccessfully. Thus a new VC bulk request can be made. A difference between the last_VCI and current_VCI parameters less than the delta_threshold parameter indicates that the current VCI is too close the end of the current VCI range. This indicates that the number of available established virtual circuits is getting too low to satisfy additional request for VCIs. Consequently, if condition (2) is satisfied, CMS 116 sends a bulk virtual circuit connection request to CCS 120 to obtain an additional VCI range.

Condition (3) determines when the status parameter has the value FAIL. This condition indicates that the prior bulk virtual circuit connection request completed, albeit unsuccessfully. Because the request completed unsuccessfully, CMS 116 sends a bulk virtual circuit connection request to CCS 120 to obtain an additional VCI range. Because the value of the last_VCI parameter is not updated when a bulk virtual circuit request fails, this request in this case is essentially a retry of the prior failed request.

Condition (4) determines when the status parameter has the value SUCCESS and the difference between the last_VCI and current_VCI parameters is greater than delta_threshold. The status having a value other than IN_PROCESS indicates that the prior VCI connection request completed successfully. Thus a new VC bulk request can be made. A difference between the last_VCI and current_VCI parameters greater than the delta_threshold parameter indicates that the current VCI is sufficiently far from the end of the current VCI range that a bulk virtual circuit connection request is required. Consequently, if condition (2) is satisfied, CMS 116 does not send a bulk virtual circuit connection request to CCS 120.

Condition (5) determines when the status parameter has the value IN_PROCESS and the difference between the current_time parameter and the start_time parameter is less than the time_threshold parameter. The value of the status parameter as IN_PROCESS indicates that the prior bulk virtual circuit request has not completed, that is, it has not returned a SUCCESS or FAIL indication to CMS 116. If condition (5) is met, then the time_threshold has not been exceeded. This indicates that not enough time has elapsed since the submission of the prior bulk virtual circuit request and the current time to warrant alarm. Consequently, a new bulk virtual circuit connection request is not sent at this time. This in effect serializes pending bulk virtual circuit connection requests. Thus, if condition (5) is satisfied, CMS 116 does not send a bulk virtual circuit connection request to CCS 120.

Condition (6) determines when the status parameter has the value IN_PROCESS and the difference between the current_time parameter and the start_time parameter is greater than the time_threshold parameter. The value of the status parameter as IN_PROCESS indicates that the prior bulk virtual circuit request has not completed, that is, it has not returned a SUCCESS or FAIL indication to CMS 116. If condition (5) is met, then the time_threshold has been exceeded. This indicates that too much time has elapsed since the submission of the prior bulk virtual circuit request and the current time. This is an error condition indicating that for some reason the prior bulk virtual circuit connection request was not processed in the expected time. There are numerous reasons that this may have occurred, including system crashes, network transmission errors, and other events that can disrupt computer communications. Because, the request is taking too long, it is assumed to have failed. Consequently, if condition (6) is met, the condition is treated as a failure, and CMS 116 sends CCS 120 new bulk virtual circuit connection request. As in the FAIL case (condition (3) above), because the value of the last_VCI parameter is not updated when a bulk virtual circuit connection request fails, this request in this case is essentially a retry of the prior failed request.

Figure 3:
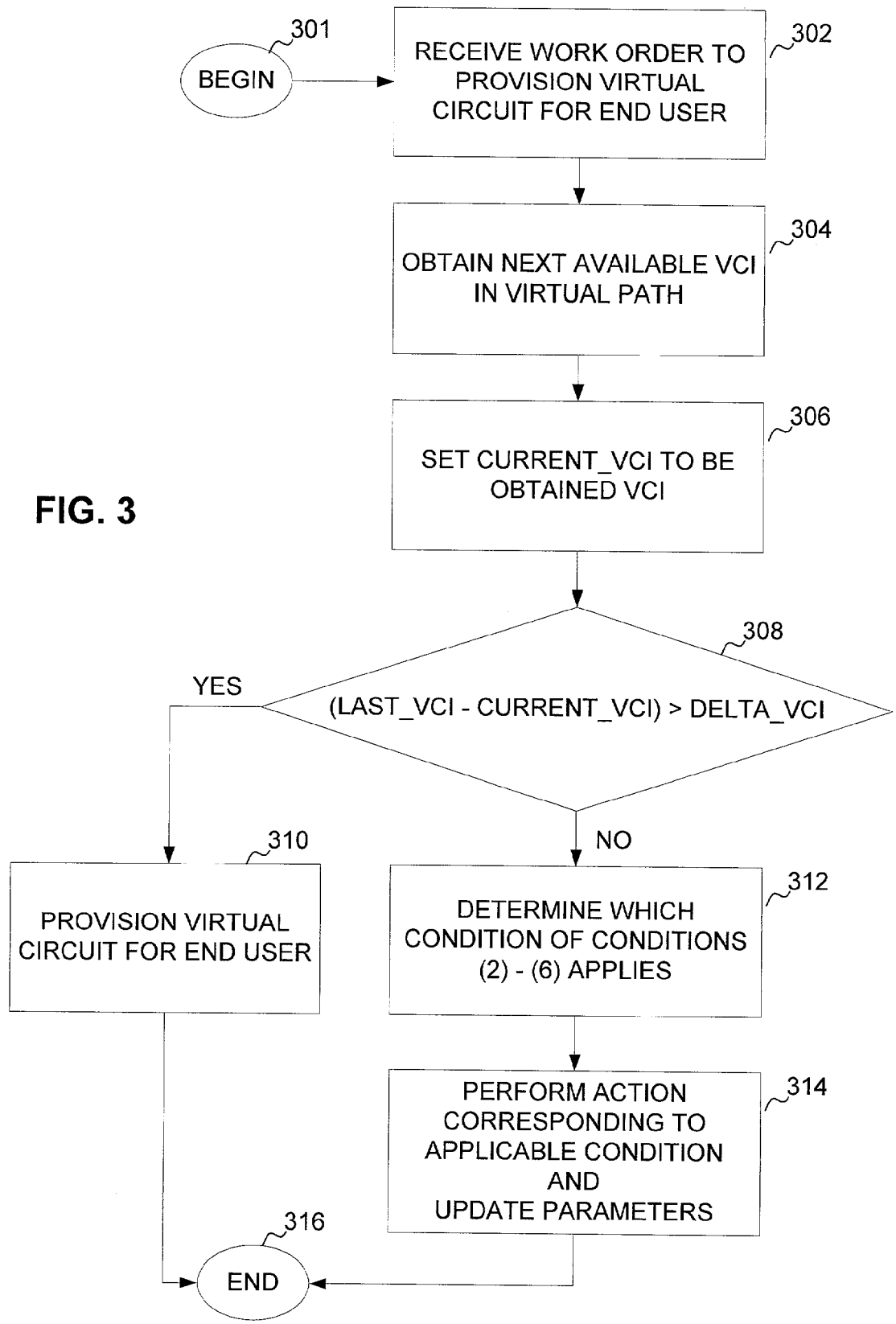
FIG. 3 is a flow chart for a method for serializing bulk virtual circuit connections according to an embodiment of the present invention.

A method for using condition table 201 to serialize bulk virtual circuit connection requests is illustrated by the flow chart of FIG. 3. The method begins in step 301. In step 302, a work order is received to provision an end user with a new virtual circuit. In step 304, CMS 116 determines the next available VCI in a virtual path that can service the new end user. If no such virtual path exists, the next VCI is the first VCI that can be assigned to an end user. For example, the first VCI is commonly 32. Alternatively, the desired VCI can be given in the work order. In this case, the next_VCI is the VCI provided in the work order. In step 306, CMS 116 sets the current_VCI parameter to be the VCI determined in step 306. Step 306 is optional. That is, CMS 116 could execute step 308 after step 204 and just use the VCI determined in step 304 for the value of the current_VCI parameter.

In step 304, CMS 116 determines whether the quantity (last_VCI−current_VCI) is greater than the value of the delta_threshold parameter. This is condition (1). As described above, condition (1) is a threshold condition. If the quantity is greater than the value of the delta_threshold parameter, processing continues in step 310 with the step of provisioning the virtual circuit for the end user. Typically, such provisioning requires CMS 116 to send a request to CCS 120 to provision the virtual circuit for the end user.

If the quantity (last_VCI−current_VCI) if less than or equal to the value of the delta_threshold parameter, the current VCI is close enough to the last_VCI obtained from the previous successful bulk virtual circuit connection request that a new bulk virtual circuit connection request should be submitted to obtain additional VCIs. However, there may already be a pending bulk virtual circuit connection request.

To avoid errors with submitting bulk virtual circuit connection requests close-in-time to one another, the present invention serializes the bulk virtual circuit connection requests using conditions (2)-(6) in condition table 201. Thus, processing continues in step 312 by determining which of conditions (2)-(6) is satisfied using the current value of the serialization parameters described above. In step 314, the action associated with the applicable condition is performed. This action could be to send the bulk virtual circuit connection request, or to not send the bulk virtual circuit connection request. After the action is performed, the method ends in step 316.

Conditions (2)-(6) can be checked in any order in step 312. However, preferably, the conditions are checked in the order shown in condition table 201. That is, in step 312, condition (2) is checked, then condition (3), and so on until condition (6) is checked.

The virtual circuit can be provisioned in accordance with the result of the action performed in step 314. If no bulk virtual circuit connection request is sent, provisioning depends on the result of the pending bulk virtual circuit connection request. If that request fails, (i.e., status=FAIL) the end user is not provisioned for the new virtual circuit. If that request is successful, (i.e., status=SUCCESS) the end user is provisioned with the new virtual circuit. If a bulk request is sent, provisioning depends on the outcome of the sent bulk virtual circuit connection request. If that request fails, (i.e., status=FAIL) the end user is not provisioned for the new virtual circuit. If that request is successful, (i.e., status=SUCCESS) the end user is provisioned with the new virtual circuit. In either case, when a new bulk virtual circuit connection request is sent, the user is not provisioned with the new virtual circuit while the bulk virtual circuit request is in process (i.e., status=IN_PROCESS).

Rather than provisioning the virtual circuit in accordance with the action performed in step 314, the work order can be re-submitted after the bulk virtual circuit connection request is sent. In this case, the flow chart of FIG. 3 is followed for the resubmitted request.

Given the description of the process for serializing the bulk virtual circuit connection requests, the timing of changes to the value of the serialization parameters is considered. Delta_threshold and time_threshold are predetermined and established prior to execution. Preferably, delta_threshold and time_threshold can be changed to reflect changing implementation considerations.

The value of current_VCI is updated upon receiving a request for a new virtual circuit provisioning work order. The value of last_VCI is updated only after a successful bulk virtual circuit connection request. The value of start_time is updated at the time a new bulk virtual circuit connection request is submitted. The value of current_time is updated at the time when a condition is checked. The value of status is updated to be IN_PROCESS when a bulk virtual circuit connection request is sent, and then to FAIL or SUCCESS after the bulk virtual circuit connection request completes.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for serializing a bulk virtual connection request in response to a request for provisioning of a virtual circuit connection for an end user in a virtual path that provides connectivity between the end user and an Internet service provider, comprising:
    obtaining a virtual circuit identifier associated with a next available virtual circuit connection;
    determining whether the virtual circuit identifier is close to an end of a range of virtual circuit identifiers that have been established;
    provisioning the virtual circuit connection for the end user if the circuit identifier is not too close to a maximum value of the end of the range or virtual circuit identifiers; and
    serializing sending of bulk virtual circuit connection requests to request provisioning a plurality of additional virtual circuit connections having an associated range of virtual circuit identifiers
    storing a virtual circuit identifier in a current virtual circuit identifier parameter, the current virtual circuit identified corresponding to a current virtual circuit that can be provisioned for an end user;
    storing a last virtual circuit identifier in a last virtual circuit identifier parameter, the last virtual circuit identifier corresponding to the maximum value circuit identifiers returned by a previous bulk virtual circuit connection request;
    storing a status of a previous request for a bulk virtual circuit connection in a status parameter;
    storing a delta threshold in a delta threshold parameter, the delta threshold indicating the point at which a new bulk virtual circuit connection request is to be sent to establish additional virtual circuit connections;
    storing a current time in a current time parameter;
    storing a pre-determined ti threshold corresponding to maximum time duration in which a pending bulk virtual circuit connection request is expected to complete;
    determining whether the difference between the last virtual circuit identifier and the current virtual circuit parameter is greater than the delta threshold;
    wherein serializing comprises determining which one of the following condition (1)-(5) is applicable if the difference between the last virtual circuit identifier and the current virtual circuit parameter is not greater than the delta threshold:
        (1) the status parameter has a SUCCESS value and the difference between the last virtual circuit identifier and the current virtual circuit parameter is less than the delta threshold;
        (2) the status parameter has a FAIL value;
        (3) the status parameter has a SUCCESS value and the difference between the last virtual circuit identifier and the current virtual circuit parameter is greater than the delta threshold;
        (4) the status parameter has a IN_PROCESS value and the difference between the current time and the start time is less than the time threshold;
        (5) the status parameter has a IN_PROCESS value and the difference between the current time and the start time is greater than the time threshold; and
    determining whether to send a bulk virtual circuit connection request in accordance with the determinations made in the determining whether the difference between the last virtual circuit identifier and the current virtual circuit parameter is greater than the delta threshold and the serializing.

2. The method of claim 1, further comprising provisioning the virtual circuit for the end user if the difference between the last virtual circuit identifier and the current virtual circuit parameter is greater than the delta threshold.

3. The method of claim 2, further comprising sending a bulk virtual circuit request if one of conditions (1), (2) and (5) is satisfied.

* * * * *